(12) United States Patent
Immonen et al.

(10) Patent No.: US 9,573,140 B2
(45) Date of Patent: Feb. 21, 2017

(54) CLOSING VALVE UNIT FOR A CYCLONE

(75) Inventors: Jarmo Immonen, Pyhalto (FI); Marita Jarvinen, Espoo (FI); Simo Suortti, Summa (FI)

(73) Assignee: Andritz Oy, Helsinki (FI)

( * ) Notice: Subject to any disclaimer, the term of this patent is extended or adjusted under 35 U.S.C. 154(b) by 519 days.

(21) Appl. No.: 14/343,575

(22) PCT Filed: Sep. 6, 2012

(86) PCT No.: PCT/FI2012/050865
§ 371 (c)(1),
(2), (4) Date: Jun. 17, 2014

(87) PCT Pub. No.: WO2013/034808
PCT Pub. Date: Mar. 14, 2013

(65) Prior Publication Data
US 2014/0319052 A1   Oct. 30, 2014

(30) Foreign Application Priority Data

Sep. 7, 2011   (FI) ........................ 20115881

(51) Int. Cl.
| | |
|---|---|
| *B04C 11/00* | (2006.01) |
| *B04C 3/06* | (2006.01) |
| *F16K 11/074* | (2006.01) |

(52) U.S. Cl.
CPC ............... *B04C 11/00* (2013.01); *B04C 3/06* (2013.01); *F16K 11/074* (2013.01); *Y10T 137/86533* (2015.04)

(58) Field of Classification Search
CPC ............. B04C 3/06; B04C 3/11; F16K 11/074
See application file for complete search history.

(56) References Cited

U.S. PATENT DOCUMENTS 3,543,931 A   12/1970   Rastatter

FOREIGN PATENT DOCUMENTS

| EP | 1 391 245 | 2/2004 |
|---|---|---|
| GB | 2 024 664 | 1/1980 |
| WO | 2007080185 | 7/2007 |

OTHER PUBLICATIONS

European Search Report cited in PCT/FI2012/050865 completed Jan. 23, 2013.

*Primary Examiner* — David A Reifsnyder
(74) *Attorney, Agent, or Firm* — Nixon & Vanderhye P.C.

(57) ABSTRACT

A closing valve unit for a centrifugal cleaner arrangement including first and second connecting members configured to connect a cyclone to a centrifugal cleaner group, and a movable valve sandwiched between the first and second connecting members, the moveable valve including apertures commensurate with openings to feed and reject conduits of the cyclone and to openings to feed and reject conduits of the cyclone cleaner group, wherein the movable valve has a first position in which the apertures are aligned with the cyclone and cleaner group feed conduits and with the cyclone accept and cleaner group accept conduits, and a control element connected to the moveable valve and configured to move the moveable valve between the first position and the second positions.

13 Claims, 3 Drawing Sheets

CLOSING VALVE UNIT FOR A CYCLONE

RELATED APPLICATIONS

This application is the U.S. national phase of International Application No. PCT/FI 2012/050865 filed Sep. 6, 2012 which designated the U.S. and claims priority to FI 20115881 filed Sep. 7, 2011, the entire contents of each of which are hereby incorporated by reference.

BACKGROUND OF INVENTION

The present invention relates to arrangements for separating and cleaning gaseous and liquid substances with cyclones and especially treating liquid suspensions that are used in the production of paper and board.

For purifying suspensions of the paper and pulp industry of coarser and/or finer impurities and dirt particles, mainly centrifugal cleaning apparatuses, i.e. hydrocyclones are used, or later, shorter, cyclones when reference is made to an individual cyclone.

The through flow of fiber suspension is enormous in a conventional paper or pulp mill and correspondingly a large amount of cyclones are needed. A centrifugal cleaning arrangement may comprise even hundreds of cyclones that are combined to form centrifugal cleaner groups. Cyclone groups may be connected in successive series or they can operate parallel connected. Individual cyclones may get clogged or otherwise require periodical cleaning or other maintenance. In that case the cyclone has to be detached from the group or to be dismantled.

Cyclones of a centrifugal cleaning plant are prone to clogging, especially at the reject end, and an individual cyclone has to be removable, dismountable or replaceable. Further, cyclones may wear in operation and require periodic replacement. In prior art centrifugal cleaner groups, convenient detaching and connecting of cyclones has been solved in many various ways. U.S. Pat. No. 4,572,787 discloses how a mutual connection of the feed and accept channels of the centrifugal cleaner group and the cyclones is effected with a push-in coupling, which is very easy to detach and connect. Additionally, the cyclones are mutually replaceable. However, the inlet, outlet and reject channels remain open while the cyclone is detached. Thereby the operation of the whole group of cyclones is to be stopped and the contents of the apparatus may leak out even abundantly. Further, the substance contained in the cyclone group may be pressurized, hot or otherwise detrimental and even dangerous for a person doing the maintenance work.

Within processes, detaching of an individual cyclone and thereby stopping of the whole group is not always even possible without disturbing other earlier or later production stages or without causing remarkable reduction in the production capacity. In the starting phase the operation of a cyclone is normal only after the cyclone has reached its full velocity, so that stopping of a whole group also causes a substantial quality problem when all the cyclones are to be restarted.

Closing valves may be mounted between the cyclone and the centrifugal cleaner group, such as in publication U.S. Pat. No. 3,989,628, whereby the maintenance operations for an individual cyclone may usually be performed without causing essential disturbance for the process.

However, these individual closing valves consume space, which hardly is adequate around tightly accommodated cyclones. Further, the operation and the actuators of the closing valves require space in order to allow access to the closing valve and ensure its operation. Especially, when horizontally located double cyclones are used, lack of space often prevents closing of the valves, specifically with respect to the inlet and outlet channels. The use of closing valves in groups of centrifugal cleaners for closing the cyclone is not very common, because of costs of valves needed and their mountings.

Closing of a reject channel is usually possible to accomplish more easily, since there is considerably more space at the narrower reject end. A pressurized reject system is additionally often provided with a regulation valve used for regulating the reject ratio, which regulation valve can in most cases be used also as a closing valve. In a free reject system, the reject conduit is not pressurized so that depending on its structure it may even be possible to leave it unclosed without any significant leakage or disturbance for the process.

Usually the closing valves are to be used in a certain order for not mixing various fractions produced by the process. Usually simultaneous closing of the feed and accept flows is advantageous. At least the inlet connection having the highest pressure should be closed first and the outlet connection immediately thereafter to avoid overpressure. Separate valves that are positioned in different directions, such as e.g. in publication U.S. Pat. No. 3,989,628, involve great risks of operating in wrong order or other malfunction, and some of the closing valves may be left open by mistake and thus cause a disturbance in the process. An individual separate closure may also easily be left unopened after replacement or re-mounting of a cyclone, whereby the cyclone will not function or functions defectively. When the number of cyclones is huge, the probability of human errors is emphasized.

SUMMARY OF INVENTION

The operator of a centrifugal cleaning apparatus may e.g. wish to alter the apparatus so that the cyclones are more easily and without the above problems removable or otherwise maintainable. In this situation it is not advantageous enough to accomplish alterations and mount separate closing valves in each connection between a channel of a group of centrifugal cleaners and their cyclones, since it is laborious and expensive. The size of the closing valves or the geometry of the cyclones may also lead to preventing of the alteration due to limited space.

It is an object of the invention to provide the widest and most versatile solution to these problems. This object is achieved by accomplishing the centrifugal cleaning apparatus mentioned in the preamble of the independent claim in accordance with the characterizing part of the claim. Preferred embodiments of the invention may correspond to the accompanying dependent claims.

An object of the closing valve unit according to the invention is that by combining the closing valves between the cyclones and the feed and accept channels of the centrifugal cleaner group to a single unit, a solution is provided that assists the detaching, replacement and maintenance of the cyclones or their parts. Then the production of the centrifugal cleaner group is not significantly disturbed and the space requirement of the centrifugal cleaner group is not substantially increased.

To avoid misuse of the closing valves and to save space, it is preferred to combine the actuators. At least the actuators should be arranged so that mistakes are visually easily controlled. Actuators located near each other help to avoid failures when replacement operations are interrupted and close location leads to successive closing operations as natural behavior. Mistakes are avoided especially when both the feed and the accept channels and sometimes also the reject channel are closed and opened essentially simultaneously with one closing motion.

If the closing valve unit has uniform connecting elements, the sizing of which corresponds to that of the cyclones and the channels of the centrifugal cleaner group, the unit can conveniently be mounted afterwards between the cyclone and the centrifugal cleaner group. Further, it is easily replaced with a new one in case of failure. Then an undamaged closing valve is not necessary needed for replacement, as the cyclone fits in place without a closing valve unit, though it is then devoid of closing possibility.

Mutually congruent flow channels and connecting members of the closing valve unit enhance the maintainability of the unit and the flexibility of mounting also in other ways. A symmetric, better sealed channel can be changed to a pressurized feed channel when the seals wear, or space required for opening can be arranged more flexibly to that side where more space is available. Any known connection ways used in pipings, such as welding, soldering, threaded couplings, flange connections or more preferably various sealing push-in connections with possible fixing and sealing members can act as connecting members of the closing valve unit.

When the aim is to only provide the open and closed states of the valve and not flow control, ball, flap and slide-type valves with their modifications are most suitable. They can also be connected to operate together and their state is easy to indicate.

A special advantage of slide type closing valves is that there is practically no need to increase the longitudinal size of their flow channels in this critical direction when the diameter is increased. Further, it is easy to implement a second flow channel, or even more, in one and the same slide and within the housing of the valve. When the closing valve wears, or the sealing is otherwise defective, a possible internal minor leakage is not a problem, provided that the closing valve unit is sealed outwardly. This gives degrees of freedom for the design of the sealing and its location in the structure. An especially space-saving, simple and secure, as well as economical solution is to use a rotatable slide that closes all the two or more flow channels simultaneously.

When fairly large flow channel diameters are used, a problem with ball valves is that their space requirement in the longitudinal direction of the flow channel increases in the same ratio as the diameter size increases. E.g. an approximately 80 mm diameter common in cyclones automatically leads to a remarkably long structure of the closing unit. Ball valves still have the advantage that even in standard valves the indication of ON or OFF is usually clearly seen from the position or indication of an actuator, such as a handle. Especially when the valves are actuated separately, these indicators should be positioned so that they are seen from the same direction of view, most preferably from the direction where the actuators of the closing valves are operated. Corresponding indications can naturally be used in connection with other types of valves also.

A flap valve could also be used due to its advantageous short structure, but especially in the case of fiber suspensions the structure may not be reliable, as fibers adhere to the protruding parts of the flap. Flap valves have been arranged also so that the motion of a detachable conduit causes a closing motion and also when the conduit is mounted back the conduit itself functions as an actuator. This would be the best solution in view of ensuring the right state of the valves.

Due to a short structure of the closing valve unit, considerable alterations to the connecting members of the cyclone may be avoided even if the closing valve unit is mounted in the centrifugal cleaner group as retrofit. A minor change in the position of cyclone feed end caused by the alteration work should not cause leakage or other problems for the sealing of the reject end or other connections, or to the fixing or operation of the cyclone.

The increased length of the structure caused by the adding of a closing valve unit may be critical if the central axes of the cyclone conduits are parallel to the cyclone's longitudinal axis as the reject end always moves to the same extent in the direction of the cyclone axis. Major alterations may also be required for the fastening of the cyclone. When the central axes of the feed conduits and accept The invention is described herein with reference to the accompanying figures, of which: conduits are directed crosswise with respect to the longitudinal axis of the cyclone, the alteration needs will be small or avoidable.

The closing valve unit may comprise individual closing valves which are arranged to correspond to a compact unit by separate fastening, supporting and connecting members. Then the closing valve unit may be comprised of e.g. at least two or more separate valves which are attached to each other, such as a ball valve with its connecting and actuating members. Thereby, for closing of a third closing valve, e.g. the reject conduit of the cyclone and the reject channel of the centrifugal cleaner group, it is easier to optionally add more closing valves into the same closing valve unit.

Advantageously the connecting members between the closing valve unit and the feed conduit of the cyclone and the closing valve unit and the accept conduit of the cyclone are parallel in the direction of their central axes. Then the detaching and connecting of the feed end of the cyclone can be performed by one motion.

Usually, closing or opening of the reject flow may be performed without doing it essentially simultaneously with the closing or opening of the feed and accept conduits. To avoid error situations the closing valve unit may comprise closing valve also for closing the reject connection.

In some centrifugal cleaner groups a flushing flow fed into the cyclone is additionally used, or another flow usually fed into the reject end, for improving the properties of the equipment. The closing valve unit may comprise closing valves also for closing the channel for these special flows. For process needs, there may be a reason to perform the opening and closing of this flow stepwise rather than essentially simultaneously. However, a flushing flow or another flow may not always be suitable for simultaneous closing and opening, and then separate actuators may be used for those valves. A reason for dividing the actuators to be separate may also be an excessively high force required by the opening and closing motions.

The advantages of the invention are best seen when the number of cyclones in the centrifugal cleaning system is highest. Some of the principal advantages are present in the case of an individual cyclone, but stopping of the cleaning process of the apparatus for the period of closing the closing valve unit cannot be avoided.

SUMMARY OF THE DRAWINGS

The invention is described herein with reference to the accompanying figures, of which.

DETAILED DESCRIPTION OF THE INVENTION

Figure 1:
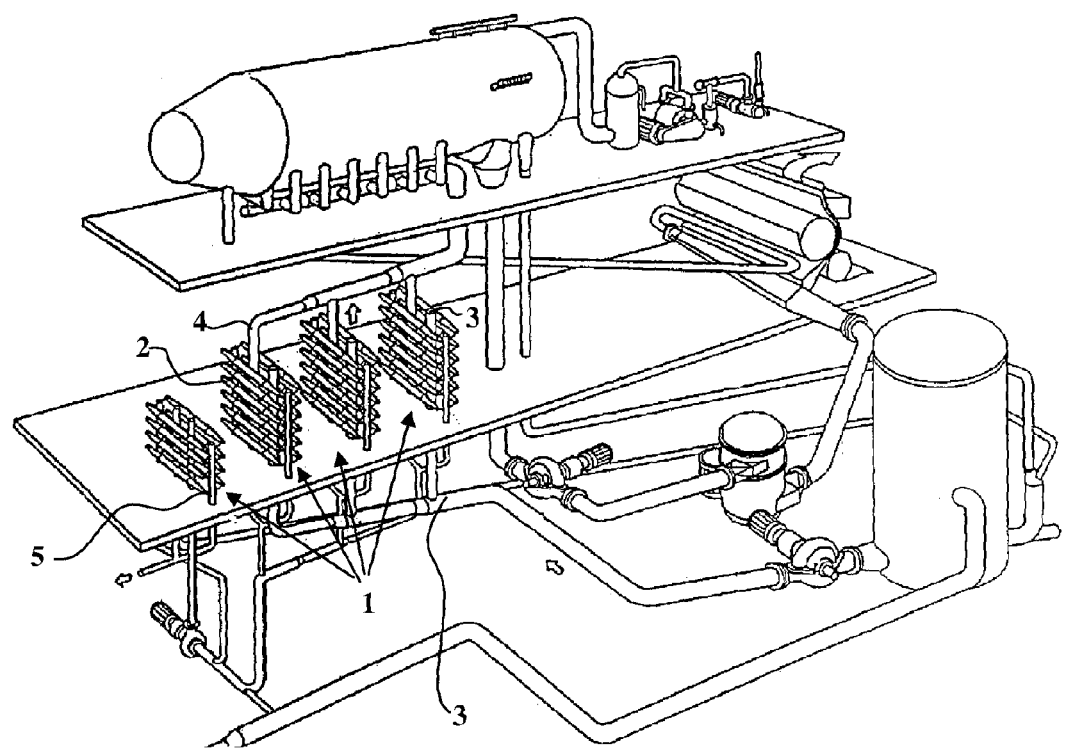
FIG. 1 illustrates a principal prior art example of a centrifugal cleaning plant connected to upstream and downstream process apparatuses. The arrangement comprises centrifugal cleaner groups comprised of tightly mounted twin cyclones. Said production plant illustrates the approach system of a paper machine headbox.

The centrifugal cleaner plant of FIG. 1 comprises several twin cyclones, which are packed as tightly as possible in several groups 1, whereto the cyclones 2 are connected to inlet, i.e. feed channels 3, outlet, i.e. accept channels 4 and reject channels 5. Additionally the figure illustrates examples of production apparatuses upstream and downstream of the cleaning stage. Typically the preceding and following processes are continuous and a good example is the approach system of a paper machine, which may comprise a considerably greater number of cyclones 2 and more tightly placed than in the exemplary figure.

Figures 2A, 2B:
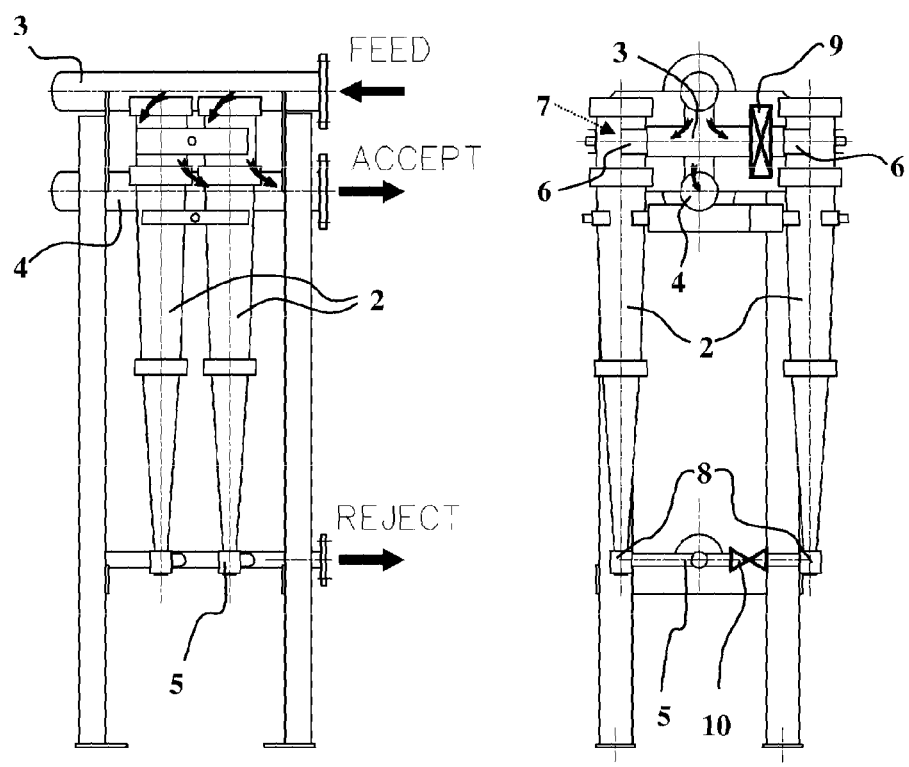
FIGS. 2a and 2b illustrate examples of connections between a centrifugal cleaner group formed of four separate cyclones and the individual cyclones.

FIGS. 2a and 2b illustrate in more detail the connections between the centrifugal cleaner group and the cyclones. There a group of four cyclones is illustrated from two directions and a closing valve unit is connected to one of the cyclones. The central axes of the feed conduits 6 and accept conduits 7 of the cyclone 2 are directed crosswise with respect to the longitudinal axis of the cyclone. In FIG. 2b the accept conduit 7 is located behind the feed conduit 6 at the same location.

The suspension to be cleaned is fed to the cyclones 2 via feed channel 3 and feed conduit 6. Due to centrifugal force, the lightest fraction, the accept, exits from the center of the vortex via accept conduit 7 to accept channel 4 which typically discharges cleaned suspension. The heaviest components, i.e. reject usually containing the impurities, are discharged via the reject conduit 8 to the reject channel 5. In view of the production process and the final product it is of course possible that suspension obtained from the reject channel 5 of the centrifugal cleaner group is later used as process raw material and discharged suspension from the accept channel 4 is treated as rejected fraction or by-product.

Typically the cyclones 2 of the centrifugal cleaner group 1 are connected to each other in parallel, i.e. same suspension is fed to all the cyclones 2 and also the accept and reject flows are connected to the relevant channels. Therefore, removing one cyclone 2 does not need to remarkably disturb the process, since others continue operating normally when the channels between the centrifugal cleaner group 1 and the cyclone are closed. Should the cyclones operate successively, i.e. in-series connected, whereby the accept or reject flow is led as feed flow for the successive cyclone, the advantage of non-stopping production would not be reached as well as in parallel connection, unless other cyclones operate in parallel with the in-series connected cyclones.

The cyclone 2 on the left in FIG. 2b is mounted into the group 1 of centrifugal cleaners without closing valves. A closing valve unit 9 according to the invention and a valve 10 influencing the flow of reject is mounted between the right-hand side cyclone 2 and the channels 3-5 of the group 1.

Both the accept conduits 7 and the reject conduits 8 may be unpressurized, or even at a negative pressure. When an unpressurized reject conduit 8 is used, it is free rejecting. The flow of reject from the cyclone 2 into the reject channel 5 may be regulated with valve 10 for controlling the operation of the cyclone.

Figure 3A:
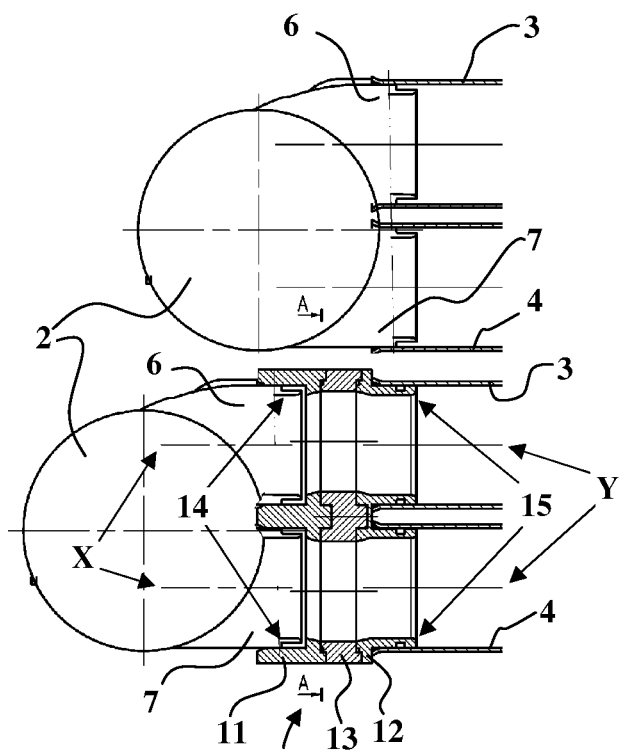
FIG. 3a illustrates as a side view an embodiment of the invention, implemented with a rotatable slide.
Figure 3B:
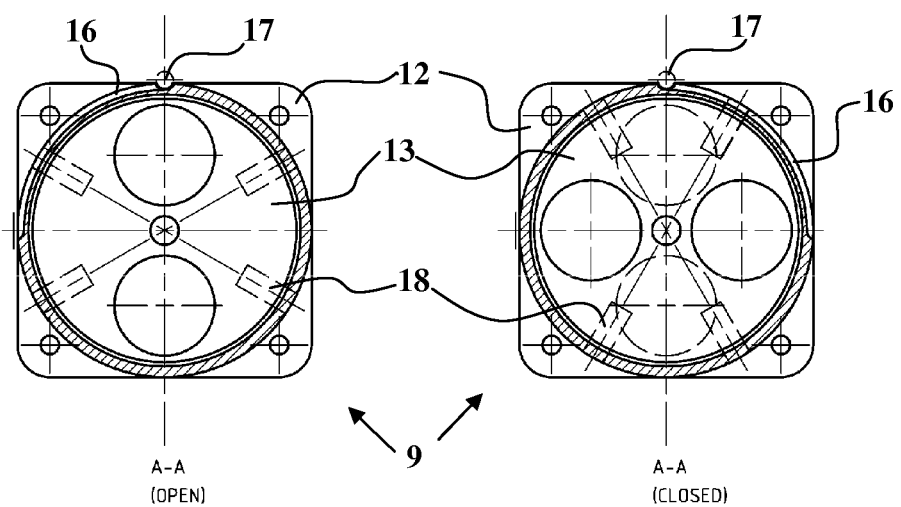
FIG. 3b illustrates cross sections of the side view of FIG. 3a at the location of the closing valve unit in extreme positions of the slide and FIG. 4 illustrates principal views of some embodiments of a slide-valve type embodiments implemented using common actuators.

FIGS. 3a and 3b illustrate the most advantageous embodiment of the invention having a rotating slide 13. The upper view of FIG. 3a illustrates the connecting of the cyclone 2 into the group 1 of centrifugal cleaners without a closing valve unit. In the lower view 3b a closing valve unit 9 with a rotating slide 13 is connected between the cyclone 2 and the channels 4 and 5 of the centrifugal cleaner unit.

The closing valve unit is based on three basic elements:
An inner end 12 that is connected with connecting members 15 to the feed channel 3 and accept channel 4 of the centrifugal cleaner group 1,
an outer end 11 that is connected with connecting members 14 to the feed 6 and accept conduits 7 of the cyclone 2, and
a rotatable slide 13 which is able to close the feed channel 3 and the accept channel 4. It may be sealed with seals that are put between the slide 13 and end parts 11 and 12.

These can be combined to form a closing valve unit 9 e.g. by fixing them to each other with bolts at the flanges of the end parts 11 and 12.

The solution according to FIGS. 3a and 3b does not make any difference as to which channel the feed and accept flows use, if the channels and connecting members are parallel and have equal size and shape. Thus the unit allows mounting to two positions, i.e. rotated by 180 degrees.

Figure 4:
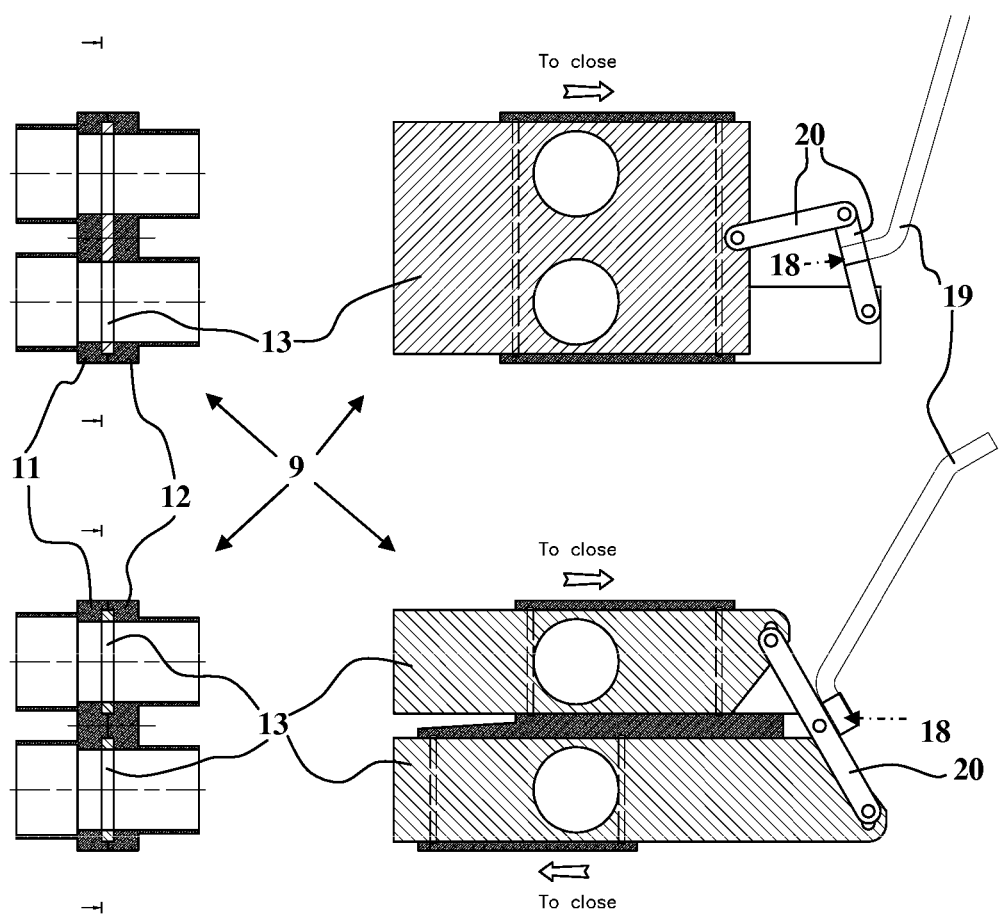

It is e.g. possible to rotate the slide 13 by means of a stationary or detachable lever positioned in a hole 18 parallel to the slide's radius, such as lever 19 in FIG. 4, which lever acts as an actuator. The slide 13 can also be provided with other kinds of protrusions, such as a stationary lever or a quadratic or hexagonal outer shape for connecting a separate actuator. If two or more non-simultaneous closings are performed with one and the same closing valve unit 9, a number of slides 13 can be positioned one upon the other and provide appropriate slots and seals to them and to the end parts 11 and 12.

The slide 13 should be accurately aligned in open position as on the left in FIG. 3b, to prevent disturbances to the flow or accumulation of particles in the grooves of the closing valve. Preferably the closed position as on the right-hand side in FIG. 3b should be positioned accurately as well. This can be ensured and the motion of the slide 13 limited e.g. by means of a groove 16 in the slide 13 and a stopper 17 adapted between the end parts 11 and 12.

An advantageous solution for sealing the connections is to use a sealing push-in connection member 14 and 15, which are widely used and corresponds to that known from U.S. Pat. No. 4,572,787. It can be accomplished simply also with an O-ring positioned in the groove of the conduit. The connecting members 14 and 15 may be just seals or they can provide fastening functions as well. Other known methods of connecting pipes, such as threaded or flange connections can be used. Usually the channels and conduits with their connecting members are rotationally symmetrical for production and sealing reasons and thus they have a central axis X for connecting members 14 and a central axis Y for connecting members 15.

Usually simultaneous closing of the channels is the easiest and most secure solution. When the actuators of the closing valves of the closing valve unit 9 are connected to each other, it is possible to make the closing valve unit operate with step-mode closing and opening intervals. Then the location of the openings of the closing valves and/or their shape or the way the actuators are connected to each other is such that the closing takes place step by step, one channel before another.

In the solution according to FIG. 3*b*, having a simultaneous closing function for the reject flow would mean that the closing valve unit 9 would have three flow channels. They would preferably be closed by means of a common slide 13 having three corresponding openings.

Most essential in view of the operation of the invention is that the closing valve unit 9 is connected to at least between the feed channel 3 and the accept channel 4 of the centrifugal cleaner group 1 and the cyclone 2 connected thereto and that the cyclone 2 is connected to the unit 9 at its feed conduits 6 and accept conduits 7 by means of detachable connecting members 14. The detachability is not inevitable, if the cyclone 2 can otherwise be dismounted for maintenance or replacement of parts.

The closing valve unit 9 may comprise separate closing valve components that are tightly fixed to each other, e.g. two ball valves tightly fixed together. Preferably the connecting members 14 between the closing valve components and the feed conduits 6 and accept conduits 6 of the cyclone 2 are positioned so that the cyclone can be connected in place e.g. by means of a sealing push-in connection.

FIG. 4 illustrates various alternative solutions based on a slide valve structures for implementing the closing valve unit 9 using combined actuators. Actuator 20 of the valve unit is operated with a solid or separate lever 19 connected to hole 18. In the lower view, the shape of the slides 13 preferably acts as a stopper for the extreme positions without separate parts. It is clear that these constructions can be implemented correspondingly also in conjunction of more than two simultaneous opening or closing operations, or with separate actuators.

The connecting members 15 between the closing valve unit 9 and the channels of the centrifugal cleaner group 1 and the connecting members 14 between the closing valve unit and the cyclone 2 need not be similar to each other and not even at the same side with respect to the flow direction, and they need not be similarly directed. Joining methods producing permanent joints, such as sizing, soldering or welding can also be used as connecting members, but usually only in joints between the closing valve unit 9 and the centrifugal cleaner group 1. Since the cyclone 2 should be maintainable for obtaining as many advantages as possible, either the conduits or the cyclone are to be removable from the closing valve unit 9 or the cyclone is to be dismountable for maintenance or replacement of parts. The connecting members 14 of the detachable joints are most preferably located directly in conjunction with the closing valve unit, but the compactness of the invention and many preferred embodiments provide limited advantage even if the closing valve unit 9 and the cyclone 2 were not directly connected to each other, but via pipe etc. channels between them.

Preferably the closing valves of both the feed channels and the accept channels of the closing valve unit 9 are connected to each other so that both are closed and opened with one closing or opening motion. With respect to the slide valve, the mutual connection of the closing valves is effected so that the flow channels of the slide 13 and the end parts 11 and 12 are normally at the same position and thus completely open and will be closed either simultaneously as in FIG. 3*b* or intentionally step-wise when the slide 13 is moved. In step-wise closing, the hole made in the slide is to be elongated in the direction of the motion, and not of the shape of the flow channels of the ends 11 and 12, so that both channels would be totally open simultaneously, but the closing and opening would take place at different positions of the slide. Step-wise closing also leads to the opening taking place in opposite order.

With other types of closing valves, e.g. the shafts of their actuators or other actuators can be combined for providing simultaneous or step-wise closing operation. In step-wise closing, the members combining the actuators, or e.g. the positioning of the axes of the ball valves with respect to each other are arranged so that the closing takes place in appropriate step-wise mode in desired order.

In a preferred embodiment, which comprises also the solutions according to FIGS. 3*a*, 3*b* and 4, the central axis X of the feed conduit 6 of the cyclone 2 and the central axis X of the accept conduit 7 of the cyclone 2 and the central axes X of their connecting members 14 are parallel to each other. Thereby, removing and connecting of the feed end of the cyclone 2 can be performed with one straight motion.

In view of retrofit, removing, replaceability and maintenance of the closing valve unit 9 it is especially advantageous, if the connecting members 15 of both the closing valve unit 9 and the feed channel 3 and the closing valve unit 9 and the accept channel 4 have the same dimensioning and mutual distance as the connecting members 14 of the cyclone feed conduit 6 and the cyclone accept conduit 7, as in FIG. 3*a*. Then, the closing valve unit 9 fits in the same connecting members 15 of the feed channels 3 and accept channels 4 of the centrifugal cleaner group 1, to which the cyclone 2 can also be connected at its feed conduits 6 and accept conduits 7.

If the central axes Y of the connecting members (15) between both the closing valve unit and the feed channel of the centrifugal cleaner group (1) and the closing valve unit and the accept channel of the centrifugal cleaner group (1) are located substantially on the same straight line as the corresponding central axes X of the connecting member (14) between the closing valve unit and the feed conduit of the cyclone and the closing valve unit and the accept conduit of the cyclone (2), the cyclone fits in a retrofit situation in the same place in the tight centrifugal cleaner group 1 still better than without this compatibility. Then also the mutual position of the reject channel 5 and the reject conduit 8 usually changes to the least possible extent.

If reject, flushing or some other special flow is additionally fed into the cyclone 2, the closing valve unit 9 may comprise closing valves for closing this flow. For process needs, there may be a reason to perform the opening and closing of this flow stepwise rather than essentially simultaneously. A result of this kind of solution can easily be that the flushing connection or something else is not always suitable for simultaneous closing and opening, and that separate actuators are to be used instead of together connected. When the total number of channels to be closed is four, it is often possible to use preferably two similar closing valve units 9, e.g. those of FIG. 3*a* and 3*b* or 4, as separate units, whereby e.g. a reject flow and another flow can be opened and closed mutually simultaneously or stepwise.

Although the above description relates to embodiments of the invention which are in the light of present knowledge considered the most preferable, it is obvious to a person skilled in the art that the invention can be modified in many different ways within the broadest possible scope defined by the appended claims alone.

The invention claimed is:

1. A valve assembly for a centrifugal cleaner arrangement comprising:
   a first connecting member configured to connect to a cyclone feed conduit and a cyclone accept conduit of a cyclone;
   a second connecting member configured to connect to a cleaner group feed conduit of a centrifugal cleaner group and an accept conduit of the centrifugal cleaner group;
   a movable valve including first and second apertures and the movable valve is sandwiched between the first and second connecting members, wherein the movable valve has a first position in which the first aperture is aligned with an opening to the cyclone feed conduit and to an opening to the cleaner group feed conduit and the first aperture provides a passage for fluid flow between the cyclone feed conduit and the cleaner group feed conduit, and the second aperture is aligned with an opening to the cyclone accept conduit and to an opening to the cleaner group accept conduit and the second aperture provides a passage for flow between the cyclone accept conduit and the cleaner group accept conduit,
   wherein in the first position the opening to the cyclone feed conduit is coaxial with an axis of the cyclone feed conduit and the opening to the cyclone accept conduit is coaxial with an axis of the cyclone accept conduit;
   the movable valve has a second position in which a solid portion of the movable valve entirely blocks the opening to the cyclone feed conduit and entirely blocks the opening to the cyclone accept conduit, and
   a control element connected to the moveable valve and configured to move the moveable valve between the first position and the second position.

2. The valve assembly of claim 1 wherein the axis of the cyclone feed conduit is coaxial with an axis of the first aperture and is coaxial with an axis of the cleaner group feed conduit while the movable valve is in the first position.

3. The valve assembly of claim 1 wherein the first connecting member includes a first bracket and the second connecting member includes a second bracket complementary to the first bracket, wherein the movable valve slides within and between the first and second brackets.

4. The valve assembly of claim 3 wherein the moveable valve is a circular plate and rotates between the first and second positions.

5. The valve assembly of claim 3 wherein the movable valve is a rectangular plate and slides between the first and second positions.

6. The valve assembly of claim 1 wherein the first aperture is congruent with the opening to the cyclone feed conduit and the opening to the cleaner group feed conduit, and the second aperture is congruent with the opening to the cyclone accept conduit and the opening to the cleaner group accept conduit.

7. The valve assembly of claim 1 wherein the axis of the cyclone feed conduit is parallel to the axis of the cyclone reject conduit.

8. A centrifugal cleaner arrangement comprising:
   a cyclone including a cyclone feed conduit and a cyclone accept conduit; a centrifugal cleaner group including a cleaner group feed conduit and a cleaner group accept conduit;
   a closing valve unit connecting the cyclone feed and accept conduits to the cleaner group feed and accept conduits, the closing valve unit including a first connecting member, a second connecting member and a movable valve sandwiched between the first and second connecting members;
   the second connecting member is configured to connect to a cleaner group feed conduit of a centrifugal cleaner group and an accept conduit of the centrifugal cleaner group;
   the moveable valve including a first aperture commensurate with an opening to the cyclone feed conduit and an opening to the cleaner group feed conduit, and a second aperture commensurate with an opening to the cyclone accept conduit and an opening to the cleaner group accept conduit,
   wherein the movable valve has a first position in which the first aperture is aligned with the cyclone feed conduit and the cleaner group feed conduit and the first aperture provides a passage for fluid communication between the cyclone feed conduit and the cleaner group feed conduit, and the second aperture is aligned with the cyclone accept conduit and the cleaner group accept conduit and the second aperture provides a passage for fluid communication between the cyclone accept conduit and the cleaner group accept conduit,
   wherein in the first position the opening to the cyclone feed conduit is coaxial with an axis of the cyclone feed conduit and the opening to the cyclone accept conduit is coaxial with an axis of the cyclone accept conduit;
   the movable valve has a second position in which a solid portion of the movable valve entirely blocks the opening to the cyclone feed conduit and entirely blocks the opening to the cyclone accept conduit,
   and a control element connected to the moveable valve and configured to move the moveable valve between the first position and the second position.

9. The centrifugal cleaner arrangement of claim 8 wherein the axis of the cyclone feed conduit is coaxial with an axis of the first aperture and is coaxial with an axis of the cleaner group feed conduit while the movable valve is in the first position.

10. The centrifugal cleaner arrangement of claim 8 wherein the first connecting member includes a first bracket and the second connecting member includes a second bracket complementary to the first bracket, wherein the movable valve slides within and between the first and second brackets.

11. The centrifugal cleaner arrangement of claim 8 wherein the moveable valve is a circular plate and rotates between the first and second positions.

12. The centrifugal cleaner arrangement of claim 8 wherein the movable valve is a rectangular plate and slides between the first and second positions.

13. The centrifugal cleaner arrangement of claim 8 wherein the first aperture is congruent with the opening to the cyclone feed conduit and the opening to the cleaner group feed conduit, and the second aperture is congruent with the opening to the cyclone accept conduit and the opening to the cleaner group accept conduit.

* * * * *